Sheet 1. 2 Sheets.

G. Wellman.

Carding Engine.

No. 2,705. Reissued Jul. 30, 1867.

Witnesses:
Wm. C. Hibbard
Chas. A. Jordan.

Inventor.
Jno. B. Bates
Admr.

N. PETERS, PHOTO-LITHOGRAPHER, WASHINGTON, D. C.

G. Wellman.

Carding Engine.

No. 2,705. Reissued Jul. 30, 1867.

Witnesses:

Wm. C. Hibbard

Chas. A. Jordan

Inventor:

Wm. B. Bates
Admx.

N. PETERS, PHOTO-LITHOGRAPHER, WASHINGTON, D. C.

UNITED STATES PATENT OFFICE.

WILLIAM B. BATES, OF MANSFIELD, MASSACHUSETTS, ADMINISTRATOR OF THE ESTATE OF GEORGE WELLMAN.

IMPROVEMENT IN STRIPPING TOP-FLATS IN CARDING-MACHINES.

Specification forming part of Letters Patent No. 14,481, dated March 18, 1856; antedated November 25, 1853; reissue No. 2,705, dated July 30, 1867.

*To all whom it may concern:*

Be it known that GEORGE WELLMAN, formerly of Lowell, in the county of Middlesex and State of Massachusetts, now deceased, did in his lifetime invent certain new and useful Improvements in Mechanism for Automatically Stripping or Cleansing the Top Cards of Carding-Engines, of which invention the following is a full, clear, and exact description, taken in connection with the accompanying drawings, making a part of this specification, in which—

Figure 3:
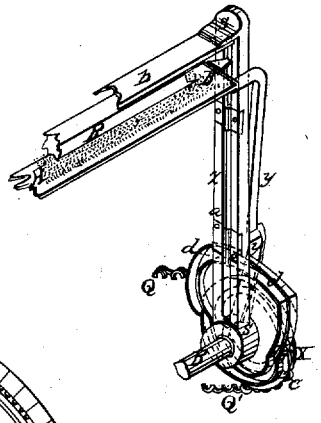
Figure 1:
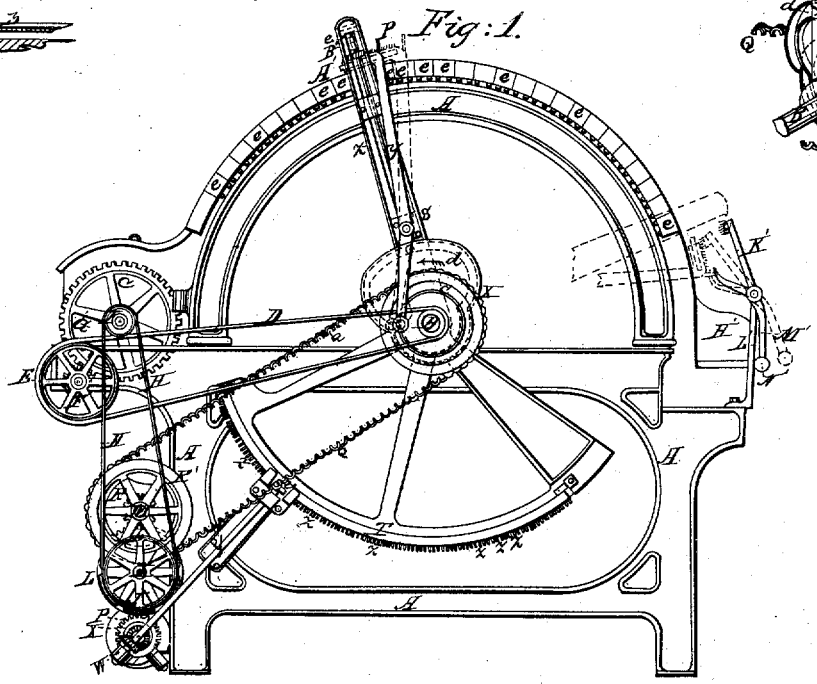
Figure 2:
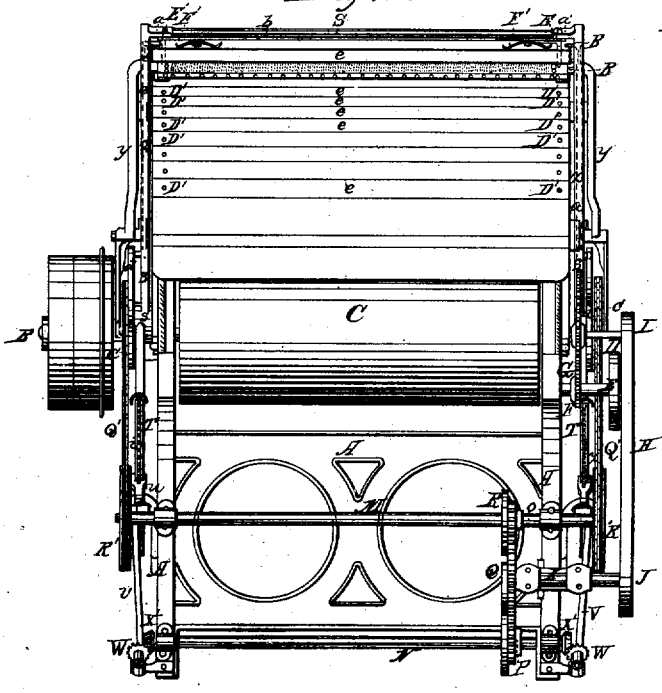
Figure 4:
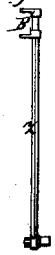

Figure 1 represents an end elevation of the frame and a few of the working parts of a carding-engine having my improved stripping apparatus attached thereto. Fig. 2 is a side elevation of the same. Fig. 3 is a perspective view, from the inside of the machine, of a part of one top card elevated in the jaws of one of the lifting-rods, and a part of the stripper-card in the act of cleansing said top card; also, showing the manner in which the double-cam acts in connection with the lifting-rod and the stripping-lever and the chain-belt which gives it motion. Figs. 4 to 9 represent details of mechanism that will be more particularly referred to hereafter in the description.

The same letters indicate like parts in all the figures.

This invention relates, in the first place, to the mechanism by which an intermittent rotation is given to the mechanism by which the top card is raised, cleansed, and lowered to its seat, and to the mechanism by which the cleansing apparatus is moved from one top card to another from a continuously-revolving shaft, so that a much greater extent of motion, up to an entire revolution or more, may be given between the periods of rest than by the devices heretofore used; and consists in the employment of a continuously-revolving segmental gear and set-rim or locking-plate connected therewith, in combination with a pinion also connected with a locking-plate or recess corresponding with the other locking-plate or set-rim, and constructed substantially as will be hereafter described; and it also consists in the employment, with said segmental gear and set-rim, of two of said pinions, each with its locking-plate or recess, one to actuate the cleansing mechanism, and the other to move the cleansing mechanism from one top card to another, and placed on opposite sides of said segmental gear, so that when one of said pinions is rotated the other is held at rest, and vice versa. This invention relates, in the second place, to the construction of the mechanism for moving the cleansing-frame from one top card to another; and consists in combining, with the cleansing-frame, a mangle-gear, arranged upon a segment attached directly to said cleansing-frame, by which means all intermediate mechanism is avoided. This invention relates, in the third place, to the construction and arrangement of the stripping-card and the parts connected therewith; and consists in mounting the stripping-card upon radial arms that have their centers or axes below the stripping-card upon the cleansing-frame, and near the axis of the same, so that the face of the stripping-card, in its movement, describes an exterior curve instead of interior curve, which enables it to operate more perfectly upon the top card in stripping it, and affords greater facility for co-operating with the cams that actuate the same, and avoids placing that mechanism above the top cards.

This invention relates in the fourth place to the manner of arranging and combining the mechanism that raises and lowers the top card with that which strips it; and consists in so combining and arranging the lifting-rod which raises the top card and the radial arm or lever which carries the stripping-card upon either side of the machine that they both can be operated by a double-grooved cam without the intervention of any other devices.

This invention relates in the fifth place to the mechanism for holding and guiding the top cards as they are raised, cleansed, and lowered; and consists in the employment, in combination with the cleansing-frame, of guide-pins, so placed at either end of the frame that when the frame is at rest said pins will be in a line with that pair of fixed guide-pins that hold the top card that is to be raised and cleansed, so that when the top card is raised the contiguous pins form a continuous guide for the same, and hold it under the action of the stripping-card; and it also consists in the employment of springs, in combination with said movable guide-pins and the lifting-jaws, by means of which the top card is firmly held when stripped and its immediate descent insured; and, lastly, this invention relates to the mechanism by which the stripping-card is cleansed, which will be hereinafter described.

In the drawings, A is the main supporting-frame of a carding-engine. B is the shaft of the main carding-cylinder. C is the doffer-cylinder, driven from the shaft B by the band D passing round the pulley E, which is on the same stud with a pinion, F, and turning it, which turns the gear G, fixed on the shaft of the doffer-cylinder C. From the shaft of the cylinder C all the motion is derived to operate the whole stripping apparatus; and, first, the band H passes from the pulley I on the shaft of the cylinder C to a pulley, J, fixed upon the end of a short shaft, K, near the bottom of the frame. This shaft K has fixed to its other end a gear, L, which has about two-thirds of its teeth cut away, and which I call the segmental gear L. Situated above the shaft K is a shaft, M, having two chain pulleys or gears, R′ R′, fastened one to each end of it, and which, by means of the chain belts Q′ Q′ passing around them, give motion to the cams X X, which are for raising, stripping, and replacing the top card; and situated below said shaft K is another shaft, N, which gives motion to the cleansing-frame S, that carries the raising and stripping apparatus from one top card to another. On the shaft M is a pinion, O, one-third as large as the segmental gear L, from which it derives motion. P is a pinion, fixed upon the shaft N, of the same size as the pinion O, and driven by the same gear, L. When a poor or dirty staple of cotton is being carded by the machine it will fill up the teeth of the top cards much sooner than when good and clean cotton is used; consequently the top cards will need stripping oftener.

Now, as the shaft K has a constant motion, and imparts movement to all the rest of the stripping apparatus, it is evident that if the speed of this shaft is increased the top cards will be stripped the oftener. This may be done by increasing the size of the pulley I, which drives the shaft K. Every revolution of the segmental gear L will first cause one revolution of the pinion O and shaft M, and then cause one revolution of the pinion P and shaft N. The shaft M completing its revolution before the shaft N begins its, and so on.

Figure 6:
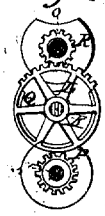

Q, Figs. 2 and 6, is a rim projecting from the side of the segmental gear L, and which occupies such part of the circumference of the gear as is not occupied by the teeth, or about two-thirds. This rim is intended to act in a circular recess on the plate R (fixed upon the side of the pinion O) in the following manner, viz: While the pinion O is just completing its revolution, the end of the rim Q is just entering the recess of the circumference of the plate R, and when the last tooth of the segmental gear L has left the pinion O, the rim Q will be fully entered within the recess in the plate R, and, as the concavity of the recess exactly fits the convexity of the rim, the plate, and consequently the pinion O and shaft M, will be prevented from turning, while the segmental gear L will continue its revolution, in order to set in motion, and then hold stationary in a similar manner, the pinion P and its shaft N. S S is a frame hung upon, and movable about, the ends of the boxes of the main cylinder-shaft B. It consists of the two radial bars *a a*, one on each end of the engine, having their upper ends connected together by the horizontal connecting-bar *b*.

Connected to, and extending downward from, the lower ends of these two bars *a a* are the two segmental pin-wheels or mangle-arcs T T. These are moved back and forth by the revolutions of the pinions U U fixed upon the ends of the inclined shafts V V, upon the other ends of which shafts are the bevel-pinions W W, which are driven by the bevel X′ X′ on the ends of the shaft N. The inclined shafts V V are supported in such a manner as to allow of a short vibration in their upper ends, enough so that when the pinions U U have moved the segmental pin-wheels T T so far in one direction as to bring the last pin in each of the series of the mangle-pins Z′ Z′, &c., opposite to them, they can make a half-revolution about said pins, and move to the opposite sides of the two series, and then produce a motion of the frame S S in an opposite direction.

The peculiarities of the movement of the frame S S are more fully described in my former patent, and do not constitute a part of my present improvements.

X X are double-faced grooved cams, movable about the ends of the boxes of the main shaft. The outer faces *c c* of these cams are intended to operate the two stripper-levers Y Y, and the inner faces *d d* to operate the lifting-rods Z Z. The levers Y Y are hung on, and are movable about, stud-pins, which are fastened one to each of the arms *a a* of the frame S. The lower ends of the levers are provided with stud-carrying friction-rollers, which work in the grooves of the outer faces *c c* of the cams X X. The other ends of the two levers Y Y extend above the upper surface of the series of top cards, and are connected together by the stripper-card A′, which is firmly secured to them. Now, at every revolution of the cams X X the levers Y Y are made to operate forth and back once; consequently, the stripper-card moves forward beneath the top card, which has been previously elevated, brushes against the teeth of said top card, and in coming back removes from the teeth all the dirt and strippings that may be there. The lifting-rods Z Z slide up and down in bearings in the arms *a a*, and fastened to their upper ends are the lifting-jaws B′ B′. (Seen more clearly in Figs. 3, 4, and 5.) A pin in the lower ends of the lifting-rod carries a friction-roll that works in the grooves of the inner faces *d d* of the cams X X, and thus when the cams revolve the lifting-rods Z Z and the jaws B′ B′ are elevated, and, as the two jaws inclose each an end of one of the top cards *e e e*, &c., said top card will be elevated from its bed also.

Figure 5:
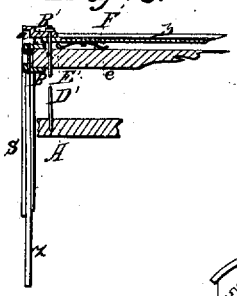

The manner of securing the top card when raised, may be seen better at Fig. 5, which is a longitudinal section of a portion of the bar *a*, and connecting-bar *b*, also of the lifting-jaws, and a portion of the top card in its elevated position, &c. A is a section of the frame or bed, and upon which the top card rests. D′ is a pin fastened to the frame A and projecting above it, for the purpose of entering a hole made in the top card. Now, when the top card is being elevated, it is guided by this pin D′, until it is raised sufficiently to be guided by the pin or dagger E′, which is fixed in the frame S, as shown, and hangs directly over D′. It then moves up the pin E′, until its upper surface comes in contact with the springs F′ F′. The top card, now being raised to its full height, is kept in that position until the stripper-card moves beneath it. Then the stripper-card rests an instant, while the top card is depressed a very little, settling the teeth of the stripper-card into those of the top card. This is accomplished by having a little fall or offset in the grooves of the inner faces *d d* of the cams X X, which will force the lifting-jaws down accordingly, and the springs F′ F′ will force the top card down upon the stripper-card, as aforesaid. Then the stripper-card moves back again to its place, and the top card is depressed, by the action of the lifting-jaws, and rod, and cam, back again to its bed or seat, and so each top throughout the series is treated in its turn in like manner.

The next point to be considered is the manner of disposing of the strippings or waste that is collected by the stripper-card A′ from the several top cards. This may be done by providing a receptacle, H′, which shall be fastened to the engine near the feed-rolls, as represented in Fig. 1, and directly over this receptacle is hung a narrow strip of wood, having upon its lower surface a comb or card clothing, or other suitable material, that shall rake or comb from the stripper-card, when it comes in contact with it, all the strippings that shall have been collected upon it in going from the first top card to the last and back again to the first. I′, Fig. 1, is the card-comb, fastened to the end of the lever K′, there being another similar lever on the opposite side of the frame to support the opposite end of the comb I′. This lever is hung on the post L′, and has an arm, M′, extending downward with a weight, N′, upon the end of it, which is for the purpose of keeping the comb I′ suspended in its position over H′. It also has a fork or branch, O′, which, when the projection P′ on the lever Y approaches it, is struck by it, and causes the comb I′ to be borne down, so that the teeth of it, I′, engage in the teeth of the stripper-card containing the strippings. This position is shown by the red lines in Fig. 1. It is also shown more clearly in Figs. 7, 8, and 9, being different views of the position drawn on an enlarged scale. This it does while the frame S is being moved over that top card nearest to the receptacle H′. Now, after this top card is raised to position the stripper-card moves forward to clean it, and in moving forward, the comb I′ combs off all the strippings that have been collected upon the stripper-card, drops them into the receptacle H′, and then the weight N′ on the opposite end of the lever K′ causes that end to fall, and brings the comb I′ up into its former position.

Figure 7:
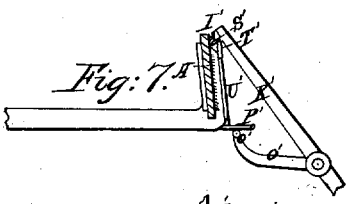
Figure 9:
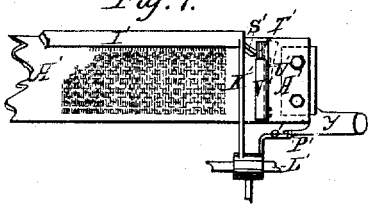
Figure 8:
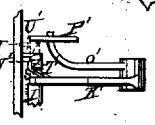

It is necessary to have some contrivance to keep the comb I′ in contact with the teeth of the stripper-card A′, while it, A′, is being cleaned by it, and such contrivance is shown in Figs. 7, 8, and 9, being three different views of it.

When the comb I′ strikes upon the stripper-card a projection, S′, on the end of the arm K′ strikes a wedge-shaped block, T′, which is fastened to the end of a spring, U′, causes the block to recede, as shown by the red lines, Figs. 8 and 9, until the end of the projection is forced below the block T′, which then, by the action of the spring U′, is made to close over the end of the projection S′, and thus holds it upon the surface of the stripper-card. This block T′ forms the mouth-piece to a groove or channel, V′, on the stripper-card A′, and the projection S′, being entered in this groove, will hold the comb I′ upon the surface of the stripper-card A′ while it, A′, is moving forward to clean the top card, and will escape from the groove at the opposite end from which it entered, the groove being long enough to hold the projection until the comb I′ has passed in contact with the whole surface of the stripper-card.

Having thus fully described the improvements, what is claimed as new, and desired to be secured by Letters Patent, is—

1. The combination of the segmental gear and its set-rim or locking-plate with a pinion and its locking-plate or recess, as a device for imparting an intermittent rotation to mechanism from a continuous one, for the purpose of operating the stripping mechanism, or that which moves the cleansing-frame from one top card to another, substantially as described.

2. The combination of the said device for producing intermittent rotation with the mechanism that lifts, strips, and lowers the top card, substantially as described.

3. The combination of the said device for producing intermittent rotation with the mechanism that moves the cleansing-frame from one top card to another, substantially as described.

4. Combining and arranging the segmental gear and its set-rim or locking-plate with the two pinions, each with its locking-plate or recess, placed on opposite sides of said segmental gear, so as to operate the stripping apparatus and move the cleansing-frame alternately, substantially as described.

5. The combination and arrangement of the mangle pins or teeth in the arc of a circle directly attached to the cleansing-frame, and concentric with its movement, for the purpose of avoiding intermediate gearing, substantially as described.

6. Mounting the stripper-card upon radial arms that have their centers or axes below the stripper-card and near the axis of the cleansing-frame, substantially as described.

7. The combination of the cams X X with the levers Y Y, carrying and operating the stripper-card, substantially as described.

8. The combination of the cams X X with the lifting-rods Z Z and the levers Y Y, arranged to operate in connection, substantially as described.

9. The combination of the cams X X with the chain-belts Q′, the chain-pulleys R′, and shaft M, arranged and operating substantially as described.

10. The combination of the guide E′ on the cleansing-frame with the stationary guide D′ on the frame of the machine, co-operating substantially as described.

11. The combination of the springs F′ and the pins E′ and lifting-rods Z and their application to the frame S, substantially as described.

12. The mechanism for cleansing the stripper-card, arranged and applied substantially as described.

Executed at Boston, May 15, 1867.

WM. B. BATES,

*Administrator of the estate of George Wellman.*

Witnesses:

CHAS. A. JORDAN,

WM. C. HIBBARD.